May 5, 1953

L. J. LUNAS 2,637,762

MOVING-COIL ELECTRICAL MEASURING INSTRUMENT

Filed Sept. 3, 1949

INVENTOR
Lawrence J. Lunas.
BY
ATTORNEY

Patented May 5, 1953

2,637,762

UNITED STATES PATENT OFFICE 2,637,762

MOVING-COIL ELECTRICAL MEASURING INSTRUMENT

Lawrence J. Lunas, Cedar Grove, N. J., assignor to Westinghouse Electric Corporation, East Pittsburgh, Pa., a corporation of Pennsylvania Application September 3, 1949, Serial No. 113,927

13 Claims. (Cl. 171—95)

This invention relates to electrical measuring instruments and it has particular relation to an instrument having two active coil sides of a moving coil disposed in air gaps of a magnetic structure.

In the past, moving coil instruments have had two active coil sides of a moving coil disposed in air gaps of a magnetic structure. However, in order to remove the moving coil from operative position with respect to the associated magnetic structure, conventional instruments of this type have required separation of parts of the magnetic structure. Such separation of parts of the magnetic structure is objectionable for numerous reasons.

When the magnetic structure is designed to permit ready withdrawal therefrom of the moving coil, some difficulty is encountered due to asymmetry of the magnetic path provided for magnetic flux produced by current flowing in the moving coil. As a result of such asymmetry, solenoid forces act between the magnetic structure and the moving coil to introduce a source of error. In certain instruments, such as permanent-magnet moving-coil instruments designed for indicating service, it may be possible to calibrate scales for accurate reading despite the presence of the solenoid forces. This may result in non-linear scales for an instrument which otherwise would be linear. However, in other instruments, such as electrodynamometer instruments, the errors introduced by solenoid forces cannot be corrected by scale calibration.

In my copending patent application Serial No. 570,028, filed December 27, 1944, issued as Patent 2,508,410, of which this is in part a continuation, I disclose a solution for errors introduced in instruments by solenoid forces. According to this solution, a moving coil is provided with a pair of magnetic structures each providing asymmetric paths for flux produced by current flowing through the moving coil. These magnetic structures are positioned reversely to produce solenoid forces which act between the magnetic structure and the moving coil in opposition to each other. Consequently, the resultant magnetic structure is substantially symmetric with respect to the path of travel of the moving coil and the solenoid forces are substantially neutralized. At the same time, the resultant magnetic structure has a continuous pathway through which the moving coil may be removed from operative position with respect to the resultant magnetic structure.

In accordance with the present invention, solenoid forces acting between a magnetic structure and a moving coil having two active sides disposed in air gaps of the magnetic structure are compensated by windings which are energized in accordance with current flowing through the moving coil. The windings produce a magnetomotive force opposing that produced by current flowing through the moving coil to compensate the aforesaid solenoid forces. Such windings facilitate the provision of a support in which the moving coil is mounted for rotation and which may be removed from the associated magnetic structure with the moving coil as a single assembly. The windings also may be employed with the previously-mentioned reversed magnetic structures to provide still further control of the accuracy of the resulting instrument.

It is, therefore, an object of the invention to provide an instrument having two active coil sides disposed in air gaps of a magnetic structure with winding means for neutralizing error forces acting between the magnetic structure and the moving coil.

It is a further object of the invention to provide an instrument having two sides of a moving coil disposed in air gaps of a magnetic structure and having a support in which the moving coil is mounted for rotation wherein the support and the moving coil are removable as a single assembly from operative position relative to the magnetic structure without disturbing the magnetic structure.

It is also an object of the invention to provide an insrument having two coil sides disposed in air gaps of two magnetic structures wherein the magnetic structures are so positioned that solenoid forces acting between the structures and the moving coil are in opposition and wherein winding means are provided for neutralizing resultant error forces acting between the magnetic structures and the moving coil.

Other objects will be apparent from the following description, taken in conjunction with the accompanying drawing, in which.

Figure 1:
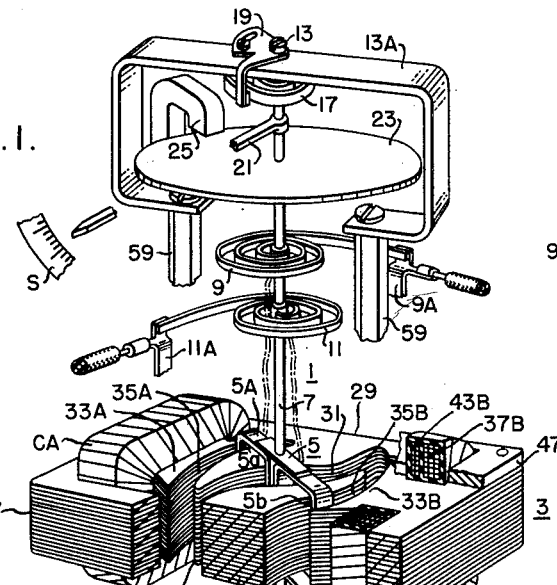
Figure 1 is a view in perspective with parts broken away of an instrument constituting an embodiment of the invention.

Referring to the drawing, Fig. 1 shows a moving coil instrument comprising a rotor assembly 1 and a stator assembly 3. The rotor assembly 1 includes a moving coil assembly 5 providing two active coil sides 5a and 5b. The moving-coil assembly may be secured in any suitable manner to a shaft 7.

As hereinbelow pointed out in the discussion of Fig. 4, the coil sides 5a and 5b may be provided by a single coil. However, in Fig. 1, two separate and similar coils 5A and 5B each provide one of the active coil sides. It will be observed that the two coils 5A and 5B are angularly spaced about the axis 7 and that the two coil sides 5a and 5b are equidistant from any point on the shaft 7. In the specific embodiment of Fig. 1, the shaft 7 is positioned between the two coil sides.

The coils 5A and 5B are energized in any suitable manner from an external circuit. For example, two spiral conductor springs 9 and 11 have their inner ends secured to insulating bushings which are positioned on the shaft 7. The outer ends of the conductor springs 9 and 11 are connected respectively to conductor lugs 9A and 11A which are secured in any desired manner to the stator assembly but which are insulated from each other. It will be assumed that the coils are connected in series between the inner ends of the conductor springs 9 and 11.

The shaft 7 is mounted for rotation between bearing screws 13 and 15 which are secured respectively to a top bearing bridge 13A and a lower bearing bridge 15A. A control spring 17 has its inner end secured to the shaft 7 and its outer end connected to a bracket 19 which is secured to the upper bearing support 13A for adjustment about the axis of the shaft 7. The control spring biases the shaft 7 towards a predetermined position.

Rotation of the shaft 7 may be employed for various purposes. For example, the shaft 7 has an arm 21 secured thereto which may be employed for operating a pen across the face of a conventional chart. For the purpose of illustration, it will be assumed that the arm 21 constitutes a pointer for indicating the rotation of the shaft on a suitably calibrated scale S.

If desired, the rotation of the shaft 7 may be damped in any conventional manner. As shown in Fig. 1, an electroconductive disk 23 is secured to the shaft for rotation therewith. This disk rotates between the pole faces of a permanent magnet 25 which is secured in any suitable manner to the stator assembly.

The stator assembly includes a magnetic structure 27 which conveniently may be constructed of a plurality of similar laminations of soft magnetic material. This magnetic structure includes a rectangular perimetric portion 29 which has two cantilever arms or cores 29A and 29B projecting inwardly in opposite directions from the perimetric portion. The core 29A projects through the coil 5A whereas the core 29B projects through the coil 5B. These two cores constitute a resultant core for the moving coil assembly which may have a substantially cylindrical peripheral surface. The two cores are separated by a passage 31. The dimensions of the moving coil assembly and the passage are so related that when the moving coil assembly is aligned with the passage, it may be moved therethrough in a direction parallel to the shaft 7.

The perimetric portion of the magnetic structure also has projecting inwardly from opposite ends thereof two pole pieces 33A and 33B. The pole pieces 33A cooperate with the core 29A to define an air gap 35A within which the coil side 5a is positioned for movement. In a similar manner, the pole piece 33B is spaced from the core 29B to provide an air gap 35B, for the coil side 5b. It will be noted that the passage 31 communicates at its ends with the air gaps 35A and 35B. Consequently, the active coil sides of the moving-coil assembly may be rotated through the air gaps until the coil assembly is in alignment with the passage 31 for removal therethrough. Conversely, the moving-coil assembly may be introduced to the passage and rotated to place the coil sides 5a and 5b in their respective air gaps.

Magnetic fields may be established in the air gaps in any suitable manner. For example, appropriate parts of the magnetic structure 27 may be constructed of permanent-magnet material for the purpose of directing magnetic flux into the air gaps. As a specific example, the pole pieces 33A and 33B may be of permanent magnetic material for this purpose. However, since the invention is particularly desirable for instruments of the electro-dynamometer type, it will be assumed that magnetic fields are produced by fixed windings 37A and 37B (Fig. 3) which surround, respectively, the pole pieces 33A and 33B.

One of the advantages resulting from the provision of the two sources such as the coils 5A and 5B is that the resulting instrument may be made substantially immune from external field influence. Such an immune instrument may be referred to as an astatic instrument.

Figure 3:
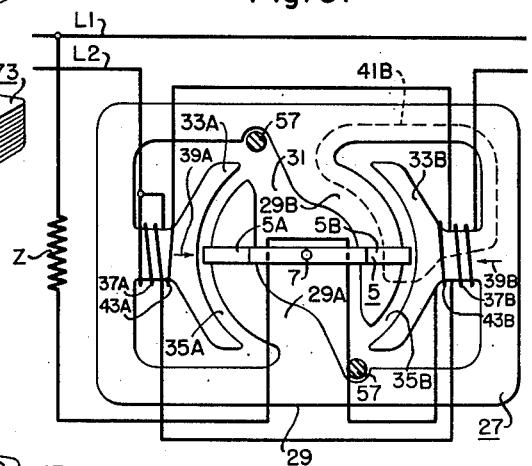
Fig. 3 is a view in bottom plan with parts broken away and parts shown schematically of the instrument illustrated in Fig. 1.

In Fig. 3, let it be assumed that the windings 37A and 37B are poled to provide magnetic flux respectively in the directions represented by the arrows 39A and 39B. For alternating-current operation, the arrows represent an instantaneous direction for the magnetic flux. Since the magnetic flux passes in opposite directions through the two air gaps, an external magnetic field tending to decrease the field in one of the air gaps would tend to increase the field in the remaining air gap and the performance of the instrument would not be materially affected by such an external field. The coils 5A and 5B may be connected to provide cumulative torques acting on the shaft 7.

If the polarity of the winding 37B is reversed, the polarity of the coil 5B also should be reversed. Under such circumstances, the coils 5A and 5B may be replaced by the single coil as discussed below with reference to Fig. 4.

The torque acting on the shaft 7 should be independent of current flowing through the coils 5A and 5B alone. However, such current may produce a solenoid force acting between the magnetic structure and the coils and these solenoid forces now will be discussed.

Referring more particularly to Fig. 3, it will be observed that the magnetic structure 27 provides magnetic paths for magnetic flux produced by current flowing through the coils 5A and 5B alone. For example, a typical path for the coil 5B would include the core 29B and the pole piece 33B. The path is represented in Fig. 3 by a dotted line 41B. This path is asymmetric with respect to the path of travel of the coil 5B. Consequently, when current flows through the coil 5B, a solenoid force is produced which acts between the coil and the magnetic structure in a direction urging the moving coil towards a position of minimum magnetic reluctance. As viewed in Fig. 3, the solenoid force urges the coil 5B in a counterclockwise direction about the axis of the shaft 7. The magnitude of the force depends on the magnitude of the current flowing through the coil. Similar comments apply to coil 5A.

In order to neutralize substantially the solenoid force acting on the coil 5B, a winding 43B may be employed for producing a compensating magnetomotive force. Conveniently, this winding 43B may surround the pole piece 33B for directing magnetic flux into the associated air gap 35B. The winding 43B is energized in accordance with energization of the coil 5B. Such energization conveniently may be effected by connecting the winding 43B in series with the coil 5B. The polarity of the winding 43B is so selected that the magnetomotive force produced thereby opposes that produced by current flowing through the coil 5B. Since the magnetomotive force of the winding 43B varies in accordance with the energization of the coil 5B, it may be proportioned to neutralize substantially the solenoid force acting on the coil 5B. By proper selection of the ampere turns of the coil 43B, the compensation may be made exact at any desired point in the path of travel of the coil 5B. For example, the compensation may be made exact when the coil 5B has the midposition in its path of travel. At the same time, the errors due to solenoid forces are compensated to a substantial degree for all other positions of the coil 5B.

The winding 43B may have a number of turns sufficient to compensate for the solenoid forces acting on both of the coils 5A and 5B. Preferably, however, a winding 43A cooperates with the coil 5A to compensate substantially for the solenoid force acting on the coil 5A. The operation of the winding 43A will be understood from the above discussion of the winding 43B.

The various windings and coils may be connected for energization in various ways. As a specific example, the instrument in Fig. 3 is associated with an external electrical circuit represented by two conductors L1 and L2. The circuit may be an alternating or direct current circuit. The windings 37A and 37B are connected in series in the conductor L2 for energization in accordance with current traversing the conductor L2. The winding 43A and the coil 5A preferably are connected in series. Similarly, the winding 43B and the coil 5B preferably are connected in series. In the embodiment of Fig. 3 the winding 43A, the coil 5A, the coil 5B and the winding 43B are connected in series across the conductors L1 and L2 through a suitable impedance Z. This impedance may in some cases be a resistor. If the conductors L1 and L2 represent an alternating-current circuit, the impedance Z may include suitable reactance for establishing desired phase relationships between current traversing the impedance and current traversing the winding 37A and 37B. The function of such an impedance for electrodynamometer instruments is well understood in the art. As a rule, the windings and coils designed for energization in accordance with the voltage of the associated circuit have a large number of turns of small-diameter conductor. The windings intended for current energization, such as the windings 37A and 37B, have, as a rule, a small number of turns of substantially larger conductor.

Inasmuch as a clear passage 31 is provided through the magnetic structure 29, it is feasible to provide a support for the rotor assembly which may be removed with the rotor assembly from the magnetic structure as a single assembly without disturbing the magnetic structure in any way. Such a support now will be described.

Referring to Fig. 1, it will be observed that a plate 47 is secured to the magnetic structure 27. This plate may be constructed of a nonmagnetic material such as brass and may be riveted permanently to the magnetic structure. The plate is shown in greater detail in Fig. 2. It will be observed that the plate has openings 47A and 47B providing clearance for the fixed windings associated with the magnetic structure. The plate 47 has an interior opening 49 sufficient in diameter to permit free passage of the moving-coil assembly therethrough.

The moving-coil assembly is supported by a ring 51 which is substantially concentric with the opening 49 and which is detachably secured to the plate 47 in any suitable manner as by one or more machine screws 53. The ring 51 conveniently may have a flange 55 which extends into the opening 49 and which engages snugly the surface bounding the opening for the purpose of locating the ring 51 relative to the plate.

The ring 51 has secured to its lower edge in any suitable manner one or more posts 57 for supporting a lower bearing bridge of the instrument. The ring 51 has has secured to its upper edge, as viewed in Fig. 2, one or more posts 59 for supporting the upper bearing bridge of the instrument. As shown more clearly in Fig. 1, two posts 59 are provided which are secured in any suitable manner to the upper bearing bridge 13A. The lower bearing bridge 15A may be secured to two of the posts 57 which extend through the magnetic structure and which are secured to the ring 51 as explained with reference to Fig. 2.

Figure 2:
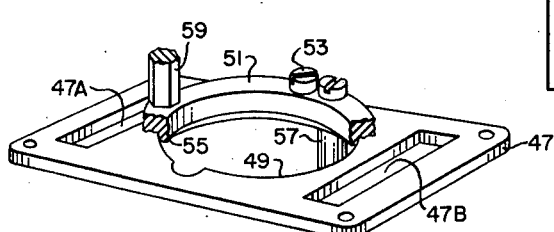
Fig. 2 is a view in perspective with parts broken away showing a portion of the instrument illustrated in Fig. 1.

The posts 57, the lower bearing bridge 15A and the bearing screw 15 all are proportioned to permit removal thereof in a direction parallel to the shaft 7 through the passage 31. Consequently, in order to remove the rotor assembly from the associated stator assembly 3, it is merely necessary to disconnect the conductor springs 9 and 11 from the lugs 9A and 11A and to remove the screws 53 (Fig. 2). The moving-coil assembly then may be rotated into alignment with the passage 31 and the entire rotor assembly, together with the entire support within which the rotor assembly is mounted for rotation may be removed from the magnetic structure in a direction parallel to the shaft 7 without disturbing the magnetic structure in any way. By a reversal of the foregoing procedure, the rotor assembly, together with its support, may be restored to operative position with respect to the associated magnetic structure.

The conductor springs 9 and 11, the disk 23, the arm 21 and the control spring 17 all are positioned on the upper side of the coils 5A and 5B as viewed in Fig. 1. Consequently none of these parts passes through the magnetic structure during the removal of the moving-coil assembly and the support from the magnetic structure. Only the posts 57 and the lower bearing 15 and the bridge 15A need be proportioned for passage through the magnetic structure.

The windings associated with each of the pole pieces may be surrounded by a common insulating casing CA or CB constructed in any suitable manner. It will be understood that if a current is superimposed on the current normally traversing the winding 37B to provide additional ampere turns equal to those which would have been supplied by the winding 43B, the winding 43B could be omitted. However, it is more practicable to supply separate windings 37B and 43B and for this reason separate windings are shown on the pole pieces.

Figure 4:
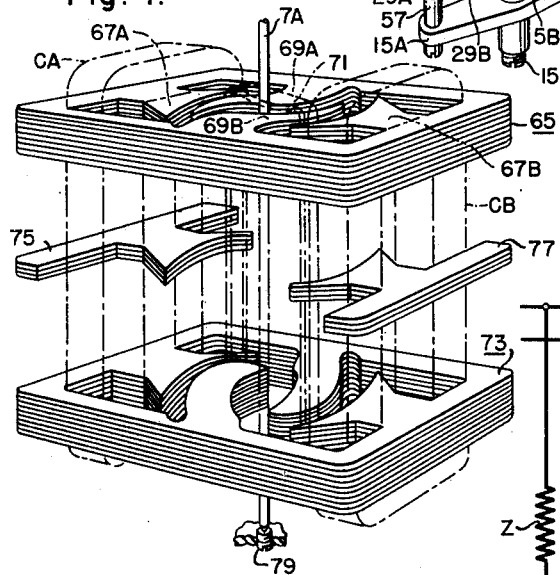
Fig. 4 is an exploded view in perspective with parts broken away of an instrument constituting a further embodiment of the invention.

In Fig. 4, the windings enclosed in the casing CA and CB again are associated in substantially the same manner with a magnetic structure 65 which is similar to the magnetic structure 27. It will be understood that the number of laminations employed for the structures 27 and 65 may differ but these laminations conveniently may be of the same configuration. The magnetic structure 65 has pole pieces 67A and 67B which correspond to the pole pieces 33A and 33B of Fig. 1. In addition, Fig. 4 shows cores 69A and 69B which correspond to the cores 29A and 29B of Fig. 1.

Although the two coils 5A and 5B of Fig. 1 may be employed in the instrument of Fig. 4, a single coil 71 is shown having one coil side in the air gap between the pole piece 67A and the core 69A. The coil 71 has a second coil side in the air gap between the pole piece 67B and the core 69B.

In order to compensate for the solenoid forces produced between the magnetic structure 65 and the coil 71, an additional magnetic structure 73 is provided. The magnetic structures 65 and 73 may be identical but are reversed with respect to each other about a line transverse to the axis of rotation of the coil 71. It will be understood that the coils within the casing CA embrace corresponding pole pieces of the two structures 65 and 73. In a similar manner, the coils within the casing CB embrace corresponding pole pieces of the magnetic structures. The coil 71 has its coil sides disposed in the air gaps of the two magnetic structures. The magnetic structures are spaced apart from each other by suitable spacers 75 and 77 for a distance sufficient to permit an end of the coil 71 to rotate between the two magnetic structures. The spacers 75 and 77 do not extend over the air gaps or cores of the associated magnetic structures. It will be understood that Fig. 4 is an exploded view and that in practice the magnetic structures engage opposite sides of the spacers 75 and 77 and are riveted securely to the spacers and to each other.

Since the solenoid forces exerted by the magnetic structures 65 and 73 on the coil 71 as a result of current flowing through the coil are oppositely directed, the resultant solenoid force acting between the resultant magnetic structure and the coil is reduced to a value which for most purposes is negligible.

At the same time, the coil 71 may be readily removed from operative position with respect to the associated magnetic structures. To remove the coil, the coil is first rotated into alignment with the passage between the cores 69A and 69B of the magnetic structure 73. The coil then is raised as viewed in Fig. 4 in a direction parallel to its supporting shaft 7A until the lower end of the coil is adjacent the magnetic structure 65. The coil next is rotated in a counterclockwise direction as viewed from the upper end of the shaft 7A into alignment with the passage between the cores 69A and 69B of the magnetic structure 65. The coil then may be lifted through the last-named passage to free it completely from the associated magnetic structure. By following a reversed sequence of steps, the coil 71 may be reintroduced into operative position with respect to the magnetic structures.

The shaft 7A may be similar to the shaft 7 and may have similar conductor springs, a damping disk and a control spring associated therewith. However, it is not contemplated that the shaft 7A will have a support removable with the coil from the associated magnetic structure as a single assembly. Bearings, such as that represented by the bearing screw 79, may be provided for the shaft 7A in any conventional manner to permit rotation of the shaft with respect to the associated magnetic structures.

Although the reversed magnetic structures of Fig. 4 substantially eliminate solenoid forces resulting from energization of the coil 71 alone, it will be found that such energization of the coil urges the coil towards a predetermined position which may be the midposition of its path of travel. The predetermined position may be varied to some extent by transferring laminations from one of the structures 65 or 73 to the other of the two magnetic structures. For example, if the magnetic structure 65 is made larger than the magnetic structure 73, the predetermined position is moved in one direction away from the midpoint of the coil travel. Conversely, if the magnetic structure 73 is made larger than the magnetic structure 65 the predetermined position is moved in the opposite direction from such midpoint.

As previously pointed out, the resultant force exerted between the magnetic structure and the coil 71 as the result of current flowing in the coil 71 alone is externally small and is within the accuracy requirements for most applications of the instrument. A further control of the resultant force exercised on the coil 71 as a result of current flowing therethrough alone is obtained by the windings 43A and 43B which, it will be recalled, are located within the casings CA and CB.

The circuit connections for the various windings of Fig. 4 may be similar to those represented in Fig. 3. However, since a single coil is employed, it will be understood that the polarities of the fixed windings are adjusted to provide the desired additive torques from the two active coil sides. Also, the single coil would be connected in series with the windings 43A and 43B for energization in accordance with the voltage between the conductors L1 and L2 through the impedance Z.

When the windings 43A and 43B of Fig. 3 are employed with the instrument of Fig. 4, the ampere turns produced thereby may be adjusted to substantially eliminate the force acting between the magnetic structures and the coil 71 as the result of current flowing through the coil 71 alone at any desired point in the path of travel of the coil 71. For example, if the zero position is at the left-hand end of the scale, the ampere turns of the windings 43A and 43B may be adjusted to eliminate substantially the aforesaid force at the zero position of the moving coil.

The instruments herein disclosed may be adapted readily for two-element operation. Such an adaptation is illustrated in Fig. 5.

Figure 5:
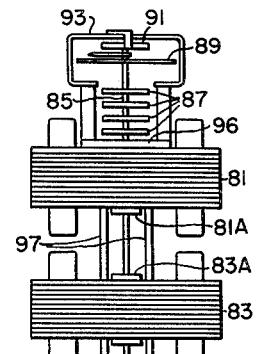
Fig. 5 is a view in side elevation of a two-element electrical instrument embodying the invention.

In Fig. 5, two magnetic structures 81 and 83 are illustrated in alignment. Each of these magnetic structures is similar to the magnetic structure 27 of Fig. 1. The magnetic structures 81 and 83 are provided respectively with coil means 81A and 83A. Each of these coil assemblies may be similar to the coil assembly 5 of Fig. 1. Both of the coil assemblies are secured to a common shaft 85 which extends completely through the two magnetic structures 81 and 83. The shaft 85 carries four conductor springs 87 which are similar to the conductor springs 9 and 11 of Fig. 1. A pair of these conductor springs provides connections for each of the coil assemblies 81A and 83A. The shaft 85 also may be provided with a damping disk 89, a control spring 91, an upper bearing bridge 93 and a lower bearing bridge 95 having constructions similar to those of corresponding parts of Fig. 1.

The upper bearing bridge 93 is secured through posts to a ring 96 which corresponds to the ring 51 of Fig. 2. This ring is secured to the magnetic structure 81 in the same manner by which the ring 51 of Fig. 2 is secured to the associated magnetic structure.

The lower bearing bridge 95 of Fig. 5 is secured through one or more rods 97 to the ring 96 in exactly the same manner by which the bearing bridge 15A of Fig. 1 is secured to the ring 51 (Fig. 2).

By inspection of Fig. 5, it will be observed that the rods 97 which support the lower bearing bridge 95 extend completely through the two magnetic structures 81 and 83. Consequently, the two coil assemblies 81A and 83A may be readily removed from their associated magnetic structures.

In order to remove the coil assemblies from the magnetic structures 81 and 83, the connections between the outer ends of the conductor springs 87 and external circuits are broken and the ring 96 is released from the associated magnetic structure 81. The coil assemblies 81A and 83A are then rotated simultaneously into alignment with the passages of the associated magnetic structures 81 and 83 which correspond to the passage 31 of Fig. 1. The entire rotor assembly including both coil assemblies 81A and 83A and the support for the rotor assembly including the bearing bridges, the ring 96 and connecting elements may be moved in an upper direction as viewed in Fig. 5 parallel to the shaft 85 for removal as a single assembly from the associated magnetic structures. By following a reverse sequence of steps, the instrument of Fig. 5 may be reassembled.

By placing all of the conductor springs 87, the indicating arm, the damping disc and the control spring adjacent the upper end of the shaft in Fig. 5, only the posts 97 the lower bearing bridge and the coil assemblies need be proportioned for movement through the magnetic structures.

Although the invention has been described with reference to the certain specific embodiments thereof, numerous modifications falling within the spirit and scope of the invention are possible.

I claim as my invention:

1. In an electrical instrument, coil means comprising a pair of spaced coil sides substantially equidistant from any point on a common axis, a magnetic structure having a separate air gap for each of the sides of the coil means, said magnetic structure having a passage communicating with the air gaps through which the coil means may be removed from operative relationship relative to the magnetic structure without disturbing the magnetic structure, means mounting the coil means for rotation relative to the magnetic structure about said axis, said magnetic structure providing a pair of asymmetric paths for magnetic flux produced by current flowing through said coil means to produce solenoid forces acting between the magnetic structure and the coil means, and winding means positioned on said magnetic structure to develop a magnetomotive force across at least one of the air gaps, said winding means being connected for energization in accordance with energization of the coil means for substantially neutralizing said solenoid forces.

2. In an electrical instrument, coil means comprising a pair of spaced coil sides substantially equidistant from any point on a common axis, a magnetic structure having a separate air gap for each of the sides of the coil means, said magnetic structure having a passage communicating with the air gaps through which the coil means may be removed from operative relationship relative to the magnetic structure without disturbing the magnetic structure, means mounting the coil means for rotation relative to the magnetic structure about said axis, said magnetic structure providing a pair of asymmetric paths for magnetic flux produced by current flowing through said coil means to produce solenoid forces acting between the magnetic structure and the coil means, winding means connected for energization in accordance with energization of the coil means for substantially neutralizing said solenoid forces, and means for establishing magnetic fields in the air gaps, said winding means being positioned on said magnetic structure to control at least one of said magnetic fields, said mounting means including a support and means securing the coil means to the support for rotation relative to the support about said axis, said support and coil means being proportioned for removal as a unit from operative position relative to the magnetic structure through the passage without disturbing the magnetic structure.

3. In an electrical instrument, coil means comprising a pair of spaced coil sides substantially equidistant from any point on a common axis, a first magnetic structure having a separate air gap for each of the sides of the coil means, said magnetic structure having a passage communicating with the air gaps through which the coil means may be removed from operative relationship relative to the magnetic structure without disturbing the magnetic structure, means mounting the coil means for rotation relative to the magnetic structure about said axis, said magnetic structure providing a pair of asymmetric paths for magnetic flux produced by current flowing through said coil means to produce solenoid forces acting between the magnetic structure and the coil means, a second magnetic structure similar to the first magnetic structure but reversed relative thereto about a line transverse to said axis, whereby the solenoid forces produced by the two magnetic structures act in opposition relative to the coil means, and winding means connected for energization in accordance with energization of the coil means for substantially neutralizing the resultant solenoid force acting on the coil means at a desired angular position of the coil means relative to the magnetic structure, said winding means being positioned on said magnetic structures to establish a magnetomotive force across at least one of the air gaps.

4. An instrument as defined in claim 3 wherein the magnetic structures are spaced along said axis for a distance sufficient to permit movement of an end of the coil means therebetween.

5. In an electrical instrument; a pair of units; each of said units comprising a pair of coil means having a pair of spaced coil sides substantially equidistant from any point on a common axis, a magnetic structure having a separate air gap for each of the sides of the coil means, said magnetic structure having a passage communicating with the air gaps through which the coil means may be removed from operative relationship relative to the magnetic structure without disturbing the magnetic structure, said magnetic structure providing a pair of asymmetric magnetic paths for magnetic flux produced by current flowing through the coil means to produce solenoid forces acting between the magnetic structure and the coil means, and winding means connected for energization in accordance with energization of the coil means for substantially neutralizing said solenoid forces; said winding means being positioned on the magnetic structure to develop a magnetomotive force across at least one of the air gaps; means mounting the magnetic structures with said axes of the two units in alignment, and means securing the coil means of the two units together for rotation as a single assembly relative to the magnetic structures about said aligned axes, said single assembly being proportioned for removal as a single assembly through said passages from operataive position relative to the magnetic structures without disturbing the magnetic structures.

6. An instrument as defined in claim 5, in combination with a support for said single assembly, and means mounting the single assembly for rotation relative to the support about the aligned axes, said support and single assembly being proportioned for removal as a complete sub-assembly from operative position relative to the magnetic structures through the passages without disturbing the magnetic structures.

7. In an electrical instrument, coil means comprising a pair of spaced coil sides substantially equidistant from any point on a common axis, a magnetic structure having a separate air gap for each of the sides of the coil means, said magnetic structure having a passage communicating with the air gaps through which the coil means may be removed from operative relationship relative to the magnetic structure without disturbing the magnetic structure, means mounting the coil means for rotation relative to the magnetic structure about said axis, said magnetic structure providing a pair of asymmetric paths for magnetic flux produced by current flowing through said coil means to produce solenoid forces acting between the magnetic structure and the coil means, winding means connected for energization in accordance with energization of the coil means for substantially neutralizing said solenoid forces, said winding means being positioned on the magnetic structure to develop a magnetomotive force across at least one of the air gaps, and winding means cooperating with the magnetic structure to establish when energized magnetic fields in the air gaps, said coil means when energized reacting with the magnetic fields in the air gaps to develop a torque acting between the magnetic structure and the coil means about said axis.

8. An instrument as defined in claim 7 wherein said mounting means includes a support and means securing the coil means to the support for rotation relative to the support about said axis, said support and coil means being proportioned for removal as a unit from operative position relative to the magnetic structure through the passage without disturbing the magnetic structure.

9. In an electrical instrument, coil means comprising a pair of spaced coil sides substantially equidistant from any point on a common axis, a magnetic structure having a separate air gap for each of the sides of the coil means, said magnetic structure having a passage communicating with the air gaps through which the coil means may be removed from operative relationship relative to the magnetic structure without disturbing the magnetic structure, means mounting the coil means for rotation relative to the magnetic structure about said axis, said magnetic structure providing a pair of asymmetric paths for magnetic flux produced by current flowing through said coil means to produce solenoid forces acting between the magnetic structure and the coil means, and winding means connected for energization in accordance with energization of the coil means for substantially neutralizing said solenoid forces, said winding means comprising a separate winding for each of the asymmetric paths, each of said separate windings being polarized to produce when energized a magnetomotive force in the associated asymmetric path cooperating with the coil means to oppose the magnetomotive force produced in said associated asymmetric path by current flowing through said coil means.

10. In an electrical instrument, coil means comprising a pair of spaced coil sides substantially equidistant from any point on a common axis, a magnetic structure having a separate air gap for each of the sides of the coil means, said magnetic structure having a passage communicating with the air gaps through which the coil means may be removed from operative relationship relative to the magnetic structure without disturbing the magnetic structure, means mounting the coil means for rotation relative to the magnetic structure about said axis, said magnetic structure providing ap air of asymmetric paths for magnetic flux produced by current flowing through said coil means to produce solenoid forces acting between the magnetic structure and the coil means, and winding means connected for energization in accordance with energization of the coil means for substantially neutralizing said solenoid forces, said winding means comprising a separate winding for each of the asymmetric paths, each of said separate windings being polarized to produce when energized a magnetomotive force in the associated asymmetric path cooperating with the coil means to oppose the magnetomotive force produced in said associated asymmetric path by current flowing through said coil means, the coil means comprising a pair of coils angularly spaced about said axis, each of the coils providing one of the coil sides, each of said coils being connected in series with one of the windings for each of said asymmetric paths.

11. In an electrical instrument, coil means comprising a pair of spaced coil sides substantially equidistant from any point on a common axis, a magnetic structure having a separate air gap for each of the sides of the coil means, said magnetic structure having a passage communicating with the air gaps through which the coil means may be removed from operative relationship relative to the magnetic structure without disturbing the magnetic structure, means mounting the coil means for rotation relative to the magnetic structure about said axis, said magnetic structure providing a pair of asymmetric paths for magnetic flux produced by current flowing through said coil means to produce solenoid forces acting between the magnetic structure and the coil means, and neutralizing means connected for energization in accordance with energization of the coil means for substantially neutralizing said solenoid forces, and means for establishing magnetic fields in the air gaps, said mounting means including a support and means securing the coil means to the support for rotation relative to the support about said axis, said support and coil means being proportioned for removal as a unit from operative position relative to the magnetic structure through the passage without disturbing the magnetic structure, said neutralizing means comprising a separate winding for each of the asymmetric paths, each of said separate windings being polarized to produce when energized a magnetomotive force in the associated asymmetric path cooperating with the coil means to oppose the solenoid force acting on said coil means.

12. In an electrical instrument, coil means comprising a pair of spaced coil sides substantially equidistant from any point on a common axis, a magnetic structure having a separate air gap for each of the sides of the coil means, said magnetic structure having a passage communicating with the air gaps through which the coil means may be removed from operative relationship relative to the magnetic structure without disturbing the magnetic structure, means mounting the coil means for rotation relative to the magnetic structure about said axis, said magnetic structure providing a pair of asymmetric paths for magnetic flux produced by current flowing through said coil means to produce solenoid forces acting between the magnetic structure and the coil means, and neutralizing means connected for energization in accordance with energization of the coil means for substantially neutralizing said solenoid forces, and means for establishing magnetic fields in the air gaps, said mounting means including a support and means securing the coil means to the support for rotation relative to the support about said axis, said support and coil means being proportioned for removal as a unit from operative position relative to the magnetic structure through the passage without disturbing the magnetic structure, said neutralizing means comprising a separate winding for each of the asymmetric paths, each of said separate windings being polarized to produce when energized a magnetomotive force in the associated asymmetric path cooperating with the coil means to oppose the solenoid force acting on said coil means, the coil means comprising a pair of coils angularly spaced about said axis, each of the coils providing one of the coil sides, each of said coils being connected in series with one of the windings for the associated one of said asymmetric paths.

13. In an electrical instrument, coil means comprising a pair of spaced coil sides substantially equidistant from any point on a common axis, a first magnetic structure having a separate air gap for each of the sides of the coil means, said magnetic structure having a passage communicating with the air gap through which the coil means may be removed from operative relationship relative to the magnetic structure without disturbing the magnetic structure, means mounting the coil means for rotation relative to the magnetic structure about said axis, said magnetic structure providing a pair of asymmetric paths for magnetic flux produced by current flowing through said coil means to produce solenoid forces acting between the magnetic structure and the coil means, a second magnetic structure similar to the first magnetic structure but reversed relative thereto about a line transverse to said axis, whereby the solenoid forces produced by the two magnetic structures act in opposition relative to the coil means, and winding means connected for energization in accordance with energization of the coil means for substantially neutralizing the resultant solenoid force acting on the coil means at a desired angular position of the coil means relative to the magnetic structure, the winding means comprising first winding means and second winding means, the first winding means acting on the asymmetric paths associated with a first one of the coil sides for producing therein a magnetomotive force which substantially neutralizes the resultant solenoid force produced by the associated asymmetric paths at said angular position of the coil means, and the second winding means acting on the asymmetric paths associated with a second one of the coil sides for producing therein a magnetomotive force which substantially neutralizes the resultant solenoid force produced by the associated asymmetric paths at said angular position of the coil means.

LAWRENCE J. LUNAS.

References Cited in the file of this patent

UNITED STATES PATENTS

| Number | Name | Date |
|---|---|---|
| 2,154,307 | Hall | Apr. 11, 1939 |
| 2,438,027 | Young et al. | Mar. 16, 1948 |
| 2,508,379 | Freedman | May 23, 1950 |
| 2,516,740 | Young | July 25, 1950 |